2,785,959
COLORIMETRIC DETERMINATION OF SULPHUR DIOXIDE

Gordon D. Patterson, Jr., Kenmore, N. Y., and Melvin Guy Mellon, West Lafayette, Ind.

No Drawing. Application March 16, 1953, Serial No. 342,754

2 Claims. (Cl. 23—232)

This invention relates to the colorimetric determination of sulfur dioxide. More particularly, this invention relates to the qualitative and quantitative analysis of air containing sulfur dioxide by means of color-changing gels. The novel color-changing gels in this invention and the method of using these gels have particular utility in the determination of sulfur dioxide in air in concentrations from 5 to 1000 p. p. m. (parts per million, by volume).

The problems of sulfur dioxide contamination in air are well known. For obvious reasons, exact agreement on the proper maximum limit of allowable concentration of sulfur dioxide has not been reached. However, the usually accepted maximum concentration for prolonged exposure is 10 p. p. m. The tolerance for 30 to 60 minutes is generally given as 50 to 100 p. p. m., while 400 to 500 p. p. m. is dangerous even for short exposures. Concentrations of the order of 1000 to 2000 p. p. m. might be fatal.

Most currently-used methods for sulfur dioxide in air depend on bubbling the sample through a solution and measuring the resulting change in some chemical or physical property of the solution (or in some cases, of the gas). Both the acidic and reducing powers of sulfur dioxide are used, and many methods and modifications are in the literature. Nearly all of them require bulky non-portable apparatus or a well-equipped laboratory.

It is therefore the principal object of this invention to provide a novel means and method for detecting sulfur dioxide and determining its concentration in a mixture of gases, such as sulfur dioxide-containing air. A further object of this invention is to provide color-changing gels which are sensitive to sulfur dioxide concentrations ranging from 5 to 1000 p. p. m. A still further object of this invention is to provide color-changing gels of the character described which are adaptable for use in the field analysis of the sulfur dioxide content for air samples and other gaseous mixtures from the standpoints of both portability and simplicity of operation. Further objects and advantages will appear as the specification proceeds.

This invention is based in part on the discovery that a color-changing material of marked sensitivity to sulfur dioxide can be produced by treating a gelable siliceous composition with a vanadate salt. The siliceous composition is preferably silica gel, and the vanadate salt is preferably ammonium vanadate. Instead of silica gel, other gelable siliceous compositions or compounds, such as ethyl silicate, $(EtO)_4Si$, etc. can be used, while other vanadate salts such as the alkali metal vanadates like sodium vanadate can be substituted for ammonium vanadate.

In practicing this invention, the gelable siliceous compound can be contacted with an ionic solution of the vanadate salt to form the sulfur dioxide-sensitive gel. For example, excellent results are obtained by impregnating activated silica gel in granular form with an aqueous solution of the vanadate salt, and removing the excess solution by evaporation or filtration. Passing a sulfur dioxide-containing gas through the impregnated granules thus obtained produces color changes which can be used for the colorimetric determination of the sulfur dioxide concentration.

The vanadate impregnated silica gel granules are preferably used by packing them into a section of a tube having a transparent wall for viewing the packed section. For example, an 8 to 10 mm. long section of a glass tube having an internal diameter of from 2 to 4 mm. can be used. The bed of granules can be held within the packed section of the tube by suitable porous retaining members, such as plugs of loosely packed glass wool or glass cloth, etc. A measured sample of the gaseous mixture to be tested (e. g., a 50 to 150 ml. air sample) is then passed through the tube, preferably at a uniform slow rate. The colors produced usually divide into five sharply defined chromatographic bands ranging in color from blue to yellow. Excellent sensitivity is obtained within the range from 5 to 1000 p. p. m. of sulfur dioxide, and determinations can also be made outside of this range, if desired. Various methods can be used to determine the sulfur dioxide concentrations from the color changes of the gel, but all methods involve essentially a comparison of the color changes with a standard set of colors for known sulfur dioxide concentrations under comparable conditions. One method (preferred for higher concentrations) depends on measurement of the length of the section of the gel which becomes discolored by the gas. The other (preferred for low concentrations) depends on a colorimetric match of the entire column of the gel with a standard series of colors, each of which corresponds to a different concentration. The matching may be done either visually or photoelectrically, and a number of instruments have been developed for semiautomatic photoelectric determinations using gels. Alternatively, the volume of the gas sample required to produce desired color changes or a desired length of the color column can be observed.

The exact amount of ammonium vanadate used is not critical. However, there are approximate minimum and maximum limits which should not be exceeded. If the ratio of vanadium to silicon is too low, the colors before and after exposure to sulfur dioxide are too "dilute" or vague. Too high a ratio causes solid salts to form separately from the gel granules, and the result is a heterogeneous mixture whose color cannot be matched or described conveniently. The best quantities are found to be approximately 2 ml. of silica gel granules per 20 ml. of saturated vanadate solution (aqueous).

The vanadate-silica gels can be prepared by immersing the activated gel granules in a solution of the vanadate, followed by removal of the solvent. The preferred method of removing the solvent is to evaporate substantially completely the water from the gel-solution mixture by heating. Decantation or filtration may result in some loss in sensitivity of the resulting gel. However, complete removal of water by evacuation to low pressures or by desiccation may also reduce or not improve the sensitivity.

Alternatively, the silica gel granules can be coated with ammonium vanadate by placing the activated gel in a glass tube and adding saturated ammonium vanadate solution dropwise at the same time that a heated, dry flow of air is passed upward from below. The rate of addition of the solution should be coordinated with the rate of flow of the drying air, so that the gel granules remain free-flowing and "dance" around inside the glass tube until all the solution has been added. Gels prepared by this method are equally or more sensitive to low concentrations of sulfur dioxide, compared with other vanadate-silica gels. They are also somewhat more uniform in color.

Gels can also be prepared using ethyl silicate, (EtO)₄Si, as the source of silicon instead of silica gel. For example, 10 ml. of saturated ammonium vanadate can be stirred with 5 ml. of ethyl silicate (boiling range 167–169° C.), which is then gelled and formed into yellow solid granules.

There are a number of points in the first method of preparation described above where the temperature is an important factor. Of these, the most important are the temperatures of evaporation and of final drying. Although the exact temperature is not critical, optimum results are obtained with evaporation and drying at 50° to 70° C. Prolonged heating is undesirable. Heating the solution before addition of the silica gel is not beneficial. Ignition of the silica at about 600°, followed by cooling in a desiccator immediately prior to the addition of the ammonium vanadate solution, results in somewhat better colors upon exposure to sulfur dioxide.

The pH of the vanadate treating solution is important for maximum sensitivity. Preferably, the aqueous solution of the vanadate salt should have a pH ranging from about 5.5 to 8.5, although pHs outside of this range can be used with some success. The optimum pH for the mixture of the silica gel and the vanadate salt appears to be around 6.3. If it is desired to lower the pH of the treating solution, this is preferably done with hydrochloric or nitric acid, although a number of other acids including sulfuric and acetic acid can be used. Ammonium hydroxide solution can be used to raise the pH if desired.

The sensitivity of the color-changing material is somewhat improved by having an ammonium salt present in the treating solution, that is, an ammonium salt other than or in addition to ammonium vanadate. For example, small amounts of ammonium nitrate, ammonium chloride, or ammonium sulphate can be used.

The particle size of the gel is of importance, although not critical. Small particle-size powders have a tendency to cause streaming and streaks to appear. However, granules down to about 200 mesh size give satisfactory results. Optimum mesh size is 25–35.

Instead of silica gel or other gel-containing silicon, other sulfur dioxide-absorptive gels can be used, such as alumina gel, titania gel, etc. However, superior results are achieved by employing gels containing silicon which is available presumably to form heteropoly compounds with the vanadium in the vanadate salt. There is evidence to indicate that a combination forms between the vanadate ion and the silica gel which results in a uniquely sulfur dioxide-sensitive material. This combination is probably a heteropoly compound containing silicon as the central atom and vanadium as the coordinate atom. The actual reactions which cause the color changes have not been conclusively determined, but may conceivably be due to either (or both) the acidic or reducing properties of the sulfur dioxide. The appearance of five distinct color bands would seem to indicate five definite steps in the total reaction, which might correspond to five different oxidation states.

The color-changing material of this invention can also be used for the chromatographic determination of other acidic gases, such as hydrogen sulfide, hydrogen chloride, etc. However, the colors produced by either hydrogen sulfide or hydrogen chloride, for example, are quite distinct from the colors produced by sulfur dioxide, and much larger amounts of these gases are necessary to cause color changes than of sulfur dioxide. Hence, they do not interfere seriously when present in a sample being analyzed for $SO_2$.

This invention is further illustrated by the following specific examples.

*Example I*

Several preparations of a yellow solid were made by heating 200-mesh silica gel with a saturated solution of ammonium vanadate. After standing overnight the mixture was filtered and the solid was dried at 110° C. The vanadate-silica gel product thus obtained was packed into a number of small glass tubes, and sulfur dioxide was passed through some of the tubes. The yellow product gave an immediate color change with sulfur dioxide from yellow to green and then to blue. Later similar preparations with the sulfur dioxide passed through the tube more slowly showed a color front of brown which moved slowly from the entrance end of the tube. When the passage of sulfur dioxide was stopped before complete saturation, the tube had a series of chromatographic-like bands, being yellow at the unreacted end and progressing through brown and a brownish-green to a light blue at the inlet end. The colors were stable for at least ten days.

*Example II*

A series of gels were prepared by heating two ml. of silica gel granules with 25 ml. of saturated ammonium vanadate solution at different temperatures for different lengths of time without complete evaporation. The excess liquid then was removed by decantation or by filtration. The more thoroughly the solution adhering to the gel was removed (by washing, by absorption with filter paper, or by suction-filtration), the less yellow the resulting gel would be and the less sensitive it would be to low concentrations. This appears to indicate that physical deposition of the ammonium vanadate salt was necessary and that adsorption of the vanadate by the silica surface was not wholly responsible for the formation of the color changing product.

*Example III*

A different method for coating silica gel granules with ammonium vanadate was found. It consisted of placing the activated gel in a glass tube and adding saturated ammonium vanadate solution dropwise from above at the same time that a heated, dry flow of air was passed in from below. The rate of addition of the solution was coordinated with the rate of flow of the drying air, so that the gel granules remained substantially free-flowing and hence "danced" around inside the glass tube until all of the ammonium vanadate solution was added. The air was dried in some cases by bubbling through concentrated sulfuric acid or through drierite. It was slightly warmed by further passage through a brass coil immersed in boiling water. Gels prepared by this method were found to be equally or more sensitive to low concentrations of sulfur dioxide, compared with other vanadate-silica gels prepared by the evaporation methods. They seemed to be more uniform in color also.

*Example IV*

A series of observations was made on the colored bands caused by a mixture of air and $SO_2$ on vanadate-silica gels, prepared as described in Example I. For these experiments, a sufficient amount of the gel was placed in a tube to form a column two or three inches long. Then the gas or vapor was passed into the column until the 'front' of the colored area had traversed about three-fourths of the length of the tube.

Repeated experiments with sulfur dioxide on the vanadate-silica gels invariably produced five chromatographic-like bands in the gels. In general, the colors produced, according to the Ostwald system of color designation, would correspond to the following sequence, in order from the inlet-end to the unreacted end:

(a) Horizon blue (15ic).
(b) Medium blue (13le).
(c) Rust brown (5pg).
(d) Olive green (24.5ni).
(e) Butter yellow-sunlight yellow (1.5ga–1.5ia).

The borders between these areas were quite sharp and distinct in each case and the colors formed were found to be permanent in tubes which were afterward open to the room air and exposed to sunlight for periods of several months or longer. The five bands were not of equal length. The brown band between the green and blue areas generally did not appear immediately and would show up about 20 to 30 minutes after the tube had been exposed. It was also always very narrow compared to the other color-bands.

Example V

For example, ten ml. of saturated ammonium vanadate were stirred with five ml. of ethyl silicate (boiling range 167–169°) in the covered 50-ml. beaker. The ethyl silicate layer became yellow immediately, and the aqueous layer became deep orange. The layers were still separate after stirring for two hours, so a few drops of 1 N sulfuric acid were added to aid the hydrolysis. After continued stirring for about six more hours and standing overnight, the solution still had two separate layers, so the mixture was then evaporated at 60°. It soon gelled and then formed a yellow granular solid. Exposure of this gel to sulfur dioxide changed its color to green and then to light blue in a manner similar to the vanadate-silica gels previously described.

Example VI

A further experiment was made following substantially the procedure of Example I, except that sodium vanadate was substituted for the ammonium vanadate in the treating solution. The resulting vanadate-silica gel composition was found to be sensitive to sulfur dioxide and to produce similar color changes to the ammonium vanadate-treated silica gels.

Example VII

For preparation of a gel color-sensitive to sulfur dioxide, the following typical procedure is applicable. First obtain or prepare a pure granular silica gel (preferably, although not necessarily, similar to that described by G. M. Shepherd in U. S. Patent 2,487,077) and further activate it by heating to a low red heat (e. g., 600° C.), followed by a cooling in a relatively dry atmosphere, such as in a desiccator containing calcium sulfate or other desiccant. Then measure out a volume of the gel (e. g., 10 ml.), place it in a glass vessel and add a volume of saturated aqueous solution of C. P. ammonium vanadate which is ten times the volume of the gel (e. g., 100 ml.). Mix the granule-solution mixture gently to free the bubbles of gas which form on the gel surface and obtain complete contact between gel-particle surfaces and the liquid. Heat the mixture in a ventilated hot air oven to a temperature of 60° C. (plus or minus 10°) until the water has evaporated completely, leaving a freely-flowing bright yellow granular gel. This gel is now ready for use and may be stored in a stoppered bottle or placed in short lengths of four to eight mm. transparent glass tubing. This is conveniently done by placing a small wad of glass wool inside such a tube near one end. Then add a measured amount of the sensitive gel and confine it with another porous plug of glass wool.

The tube is then taken to the location of the gas to be analyzed, connected to any of several means of drawing a volume of air through the tube at a slow, relatively constant, rate. Any one of a number of commercially-available metal holders with clamps to mount the tube may be used. The tube is so mounted and connected to a rubber bulb having a known volume of 25 to 50 ml. which may be squeezed to expell its air to the atmosphere and then refill at a constant slow rate by drawing the gas sample through the glass tube containing the gel. A probe tube may be connected to the intake end of the gel-containing glass tube if samples from a distance are desired. Repeated squeezing of the rubber bulb may be desirable for large samples and/or for flushing the latent air contained in the probe tubing. The color change which occurs on the gel may be observed visually and compared with other gels similarly exposed to known concentrations or with standard color-cards having printed areas of various colors corresponding to different amounts of sulfur dioxide.

Alternatively, the glass tube may be mounted so that a light beam hits the gel and then strikes a photocell which is connected electrically to a meter which indicates the amount of light passing through, or reflected from, the gel. A decrease in the amount of light is indicated by the reading of the photometer and the change in the meter reading is then a measure of the amount of sulfur dioxide causing the color change.

Unlike other gels of different compositions which are used to detect and determine other gases (e. g., carbon monoxide), no guard gel is necessary to remove possible interfering constituents of the air sample. In ordinary atmospheric samples the other commonly occurring minor components such as water vapor, carbon monoxide, carbon dioxide, the rare gases, etc., neither cause color changes nor interfere with the sensitivity of this gel to sulfur dioxide. In fact, the use of a guard gel is generally undesirable since most of the possible gels would remove the sulfur dioxide before the sample reaches the sensitive gel.

The utility of the color changing gels of this invention is not limited to the analysis of gaseous samples, although its greatest utility is for this use. However, the desired color changes do occur in aqueous solutions containing sulfite ions ($SO_3^=$). Therefore, it will be understood that the color changing gels of this invention are also susceptible to the measurement of the sulphur dioxide concentration in an aqueous solution of sulphur dioxide.

While in the foregoing specification this invention has been described with particular reference to certain preferred embodiments thereof and specific details and examples have been given by way of illustration, it will be apparent to those skilled in the art that the preferred embodiments, specific details, and examples can be varied considerably without departing from the spirit of the invention.

We claim:

1. The colorimetric method of determining the concentration of sulphur dioxide in a fluid medium, comprising contacting a sample of said medium with a color-changing material sensitive to sulphur dioxide to obtain color changes in said material, and comparing the color changes thus produced with a standard set of color changes for known sulphur dioxide concentrations under comparable conditions, said color-changing material being in granular form and comprising a siliceous gel impregnated with a vanadium salt selected from the group consisting of ammonium vanadate and the alkali metal vanadates, said color-changing material being substantially free of said vanadate salt in solid form separate from the siliceous gel granules while containing a sufficient concentration of said vanadate salt to produce distinct color bands on exposure of said material to sulphur dioxide.

2. The method of claim 1 in which said fluid medium is air, said siliceous gel is activated silica gel in granular form, and said vanadate salt is ammonium vanadate.

References Cited in the file of this patent

UNITED STATES PATENTS

| | | |
|---|---|---|
| 2,027,316 | Johnson | Jan. 7, 1936 |
| 2,174,349 | Littlefield | Sept. 26, 1939 |
| 2,271,618 | Block et al. | Feb. 3, 1942 |

(Other references on following page)

| | UNITED STATES PATENTS | |
|---|---|---|
| 2,487,077 | Shepherd | Nov. 8, 1949 |
| 2,674,582 | Darby | Apr. 6, 1954 |
| | FOREIGN PATENTS | |
| 642,970 | Great Britain | Sept. 13, 1950 |
| 178,082 | Japan | Mar. 7, 1949 |

OTHER REFERENCES

Belcher: "J. Soc. Chem. Inc., London," vol. 64, 1945, pages 111–114.

Belcher et al.: "Analytica Chemica Acta," vol. 5, 1951, page 362.